(12) United States Patent
K S et al.

(10) Patent No.: US 11,449,362 B2
(45) Date of Patent: Sep. 20, 2022

(54) RESOURCE DISTRIBUTION

(71) Applicant: zeotap GmbH, Berlin (DE)

(72) Inventors: Sathish Kumar K S, Berlin (DE); Saurabh Verma, Berlin (DE); Ashwin Srinivasan, Berlin (DE); Chaitanya Bendre, Berlin (DE); Projjol Banerjea, Berlin (DE); Daniel Heer, Berlin (DE)

(73) Assignee: zeotap GmbH, Berlin (DE)

( * ) Notice: Subject to any disclaimer, the term of this patent is extended or adjusted under 35 U.S.C. 154(b) by 323 days.

(21) Appl. No.: 16/878,691

(22) Filed: May 20, 2020

(65) Prior Publication Data
US 2021/0365292 A1 Nov. 25, 2021

(51) Int. Cl.
*G06F 9/46* (2006.01)
*G06F 9/50* (2006.01)
*G06F 17/18* (2006.01)

(52) U.S. Cl.
CPC ............ *G06F 9/5011* (2013.01); *G06F 17/18* (2013.01)

(58) Field of Classification Search
CPC .............................. G06F 9/5011; G06F 17/18
USPC ....................................................... 718/104
See application file for complete search history.

(56) References Cited

U.S. PATENT DOCUMENTS

| | | | |
|---|---|---|---|
| 9,075,860 B2 | 7/2015 | Kozina et al. | |
| 10,917,457 B2* | 2/2021 | Meng | A63F 13/352 |
| 2004/0034591 A1 | 2/2004 | Waelbroeck et al. | |
| 2012/0046996 A1 | 2/2012 | Shah et al. | |
| 2014/0278620 A1 | 9/2014 | Khan et al. | |
| 2015/0039426 A1 | 2/2015 | Rao | |
| 2021/0034374 A1* | 2/2021 | Saxena | G06F 9/544 |
| 2021/0049233 A1* | 2/2021 | Al-Mufti | G06F 17/18 |
| 2021/0073291 A1* | 3/2021 | Hunter | G06F 9/44505 |
| 2021/0117868 A1* | 4/2021 | Sriharsha | G06F 16/24568 |

OTHER PUBLICATIONS

European Search Report and the European Search Opinion dated Oct. 7, 2021 From the European Patent Office Re. Application No. 21174982.5. (9 Pages).

* cited by examiner

*Primary Examiner* — Gabriel I Garcia

(57) ABSTRACT

The present invention relates to a method for distributing resources to different data sources based on their knowledge contribution. In addition, the invention relates to a resource distribution data system for distributing resources, a computer program product for distributing resources and a computer readable medium. It may comprise the steps of receiving values from a plurality of different data sources, blending the received values for the attributes into a dataset, assigning data lineages to the values for the attributes, receiving a query for providing a data subset, providing the data subset based on the query, determining a knowledge contribution of each of the data sources to the data subset based on the data lineages of the values and instructing a distribution of shares of resources to the different data sources based on the knowledge contribution of each of the data sources to the data subset.

16 Claims, 3 Drawing Sheets

RESOURCE DISTRIBUTION

FIELD AND BACKGROUND OF THE INVENTION

The present invention, in some embodiments thereof, regards resource distribution. In particular, the present invention, in some embodiments thereof, regards a method for distributing resources and a resource distribution data system for distributing resources. The resources can be distributed based on data usage.

Data usage can be tracked with the help of data lineage systems. Data lineage systems are for example known from U.S. Pat. No. 9,075,860, U.S. Patent Application 2012/0046996, and U.S. Patent Application 2014/0278620.

Data can include blended knowledge provided by various data sources. The data sources can provide knowledge using heterogeneous values for data attributes and with different data correctness. Such data can be used in data-driven applications, e.g. in Software-as-a-Service (SaaS) or enterprise applications.

Data can be received from the data sources for an outright price and every time when new data is added to one of the data sources, a price can be assigned to this additional data. The new data can be received for the assigned price such that data can be received when it is added. This method of assigning prices to data and receiving the data from the data sources is based on demand forecast.

Other data sources can provide a transparent marketplace and list data with information about its data source. These data sources allow determining the price based on market mechanisms and add a commissioning charge to the price that has to be paid for receiving the data from the marketplace.

SUMMARY OF THE INVENTION

It can be seen as an object of the present invention to provide a method for distributing resources and a resource distribution data system which allow to determine shares of resources to be distributed to data sources from which data was received with higher accuracy and less processing.

According to an aspect of some embodiments of the present invention there is provided a method for distributing resources. The method comprises the steps:

receiving, by one or more processors, values for attributes associated to respective identifiers from a plurality of different data sources, blending, by the one or more processors, the received values for the attributes into a dataset, such that the dataset includes a plurality of identifiers and one or more values for one or more attributes are assigned to each of the identifiers, assigning, by the one or more processors, data lineages to the values for the attributes based on the data source from which a respective value for a respective attribute was received, receiving, by the one or more processors, a query for providing a data subset of the dataset based on one or more of the attributes, providing, by the one or more processors, the data subset based on the query, determining, by the one or more processors, a knowledge contribution of each of the data sources to the data subset based on the data lineages of the values for the attributes included in the dataset relevant for the query, and instructing, by the one or more processors, a distribution of shares of resources to the different data sources based on the knowledge contribution of each of the data sources to the data subset.

Since the knowledge contribution of each of the data sources to the data subset is determined based on the data lineages of the values for the attributes included in the dataset relevant for the query and the shares of resources to be distributed to the different data sources are determined based on the knowledge contribution of each of the data sources to the data subset, the shares of resources to be distributed to the different data sources can be determined without measuring a data flow to data targets that can be provided with the data subset. This allows to distribute shares of resources to the data sources without a step of metering the data flow. This furthermore allows reproducibly determining a knowledge contribution and distributing resources based on the knowledge contribution to the data sources at the attribute level. The method for distributing resources allows providing resources to the data sources with a same proportion as that of their knowledge contribution to the data subset. A larger knowledge contribution of a data source results in a larger share of resources. The method for distributing resources allows to determine knowledge contribution without manual reconciliation. This can allow to increase the number of data sources that can be handled by the method for distributing resources. Furthermore, processing speed for determining and distributing resources to different data sources can be increased. Additionally, the method can allow to determine the shares of resources to be distributed to the different data sources with a higher accuracy. Furthermore, no additional data storage is needed for storing data about metered data flow. The shares of resources to be distributed to the different data sources can be determined based on the knowledge contribution determined for the past.

The dataset and the data subset can be provided in form of a table with rows and columns. Each identifier can be assigned to a certain column of a respective row, e.g., a first column, a last column, or any other column of the respective row. The identifiers can be unique identifiers for uniquely identifying an entity, e.g., a device, an instance, or a user in an entity set. Different attributes and their values assigned to a respective identifier can be added into cells of different columns of the respective row of the identifier.

A data source identifier can be assigned to each data source. Assigning the data lineages can for example correspond to adding a column entry with a respective data source identifier for each value for an attribute based on the data source from which the value for the attribute was received. This allows to identify from which data source a respective value for an attribute was received and to provide data lineages to all values for the attributes.

Data such as the values for the attributes, data subsets, and shares of resources can be transmitted and received by wire or wirelessly.

The values for the attributes associated to the respective identifiers can be added to the dataset in case that a dataset has already been generated. In case that no previous values have been received, the values for the attributes associated to the respective identifiers can be merged into the dataset.

Providing the data subset based on the query can be performed by blending the values for the attributes requested in the query into the data subset. The query can also for example request that a data subset is provided that includes identifiers with attributes within certain value ranges. The data subset can be provided such that identifiers with a number of values for attributes received from one data source, but for which a value for a certain attribute is not received from the one data source, is complemented by a value for the certain attribute received from another data source. This can allow to provide a data subset with higher data correctness.

The method for distributing resources can be a computer-implemented method. One or more steps, such as all steps of the method can for example be performed by a resource distribution data system.

The method can distribute the resources based on data usage. The method can comprise the steps:
providing, by the one or more processors, attribute weights to the attributes based on a type of a respective attribute, and
determining, by the one or more processors, a data usage of each of the data sources for the data subset based on the knowledge contribution of each of the data sources to the data subset and the attribute weights. The shares of the resources to be distributed to the different data sources can be determined based on the data usage of each of the data sources for the data subset.

A respective share of the resources to be distributed to a respective data source can correspond to its data usage divided by a total data usage. Total data usage can be determined by summing the data usage of all data sources.

The method can comprise the step:
storing the dataset, the data subset, or both.

The dataset, the data subset, or both can for example be stored in a data storage. The data storage can be included in the resource distribution data system.

The query can be received from a data target providing the query. The data subset can be provided to the data target by transmitting it to the data target.

Additionally, the method can comprise the step:
providing, by the one or more processors, a respective attribute weight to each of the attributes based on heuristic rules or a machine learning (ML) model which optimizes the attribute weights based on one or more attribute parameters.

Attribute parameters can for example include a performance of the attribute or attribute usage. Performance can be defined as how well a task is performed that shall be performed based on the attribute. Performance can for example be estimated in terms of an accuracy, an efficiency, a speed, or a combination of them for the task at hand, e.g., targeted advertising. Performance can for example be a click through rate (CTR) in case of using the method for distributing resources for targeted advertising. In case that the method is used for prescriptive analytics in marketing technology (martech), performance can for example be customer acquisition cost, churn reduction, higher retention, or a combination thereof. Attribute weights can for example be provided to each of the attributes based on a location and/or an application of the data subset. The heuristic rules can for example include that a certain attribute has a higher attribute weight in a certain country. For example, language attributes can have a higher attribute weight in India, application usage attributes can have a higher attribute weight in the United States of America and/or vehicle related attributes can have a higher attribute weight in Spain. The heuristic rules can for example include that a higher attribute usage has a higher attribute weight. The heuristic rules can for example include that a higher attribute usage within a certain time period, e.g. within the last 10 days, has a higher weight. The heuristics rules can be weighted and combined in order to determine an attribute weight for each of the attributes. The heuristic rules can also be used as a feature set for the ML model in order to generate a dynamic model. The heuristic rules and the ML model can be extensible, i.e., they can be adapted such that further rules and respectively features can be added.

The method can comprise the step:
determining, by the one or more processors, the data usage of each of the data sources for the data subset based on the formula:

$$U(k, q) = \frac{\sum_{j=0}^{n} N(k, j) \cdot W(j)}{\sum_{k=0}^{m} \sum_{j=0}^{n} N(k, j) \cdot W(j)},$$

with $U(k,q)$ a data usage of the data source k for query q, $N(k,j)$ a knowledge contribution of data source k to an attribute j, and $W(j)$ an attribute weight of the attribute j, n a number of attributes, and m a number of data sources. This can in other words be described as $$U_{(k,q)} = \sum_{j=0}^{n} (\text{count of knowledge contributed by data source } k \text{ for attribute } j) \cdot W_{(j)}/\text{total count of knowledge contributed by all data sources}$$

The method can comprise the step:
assigning, by the one or more processors, the received values for the attributes to cells of the dataset, such that each value for an attribute is a value for an atomic attribute included in one cell of the dataset and such that the values for the atomic attributes have identical data lineages as assigned to the values for the attributes.

An atomic attribute is an attribute that cannot be divided further into meaningful smaller components or sub attributes. For example, a gender cannot be further divided. In contrast a name can for example be divided in first name and last name, such that first name is an atomic attribute while the name is not.

Determining, by the one or more processors, the knowledge contribution of each of the data sources to the data subset can be performed by counting a number of cells in the dataset that include a value for an atomic attribute with data lineage of a respective data source and which is relevant for the query for each of the data sources. This allows efficiently assigning a value of knowledge contribution to each of the data sources for a certain query by counting the number of cells in the dataset that contribute knowledge to the data subset. This furthermore allows to consider contributions to the knowledge of cells that are not included in the data subset.

Each query for a data subset can include a set of predicates on various attributes, e.g., in any of a row, a columnar, or a document storage of the data storage. A query can for example request a data subset matching some attributes or some values for some attributes. Each predicate, can contribute to a part of the data request in order to provide the data subset. Each atomic attribute can be stored in a cell of the table in the data storage and each cell can be considered as one knowledge unit contributing to the knowledge contribution. Counting the number of cells of atomic attributes relevant for a respective query can allow to determine the knowledge contribution per attribute. An atomic attribute can for example be relevant for a respective query if it matches one of the attributes of the query. The knowledge contribution can be determined for each atomic attribute and/or each attribute of each data source. The knowledge contribution can furthermore be determined for each data source based on the knowledge contribution for each atomic attribute or each attribute of each data source.

Since the knowledge contribution of each of the data sources to the data subset can be performed by counting a number of cells in the dataset that include a value for an atomic attribute with data lineage of a respective data source and which is relevant for the query for each of the data sources, the knowledge contribution can be determined and not just raw data contribution. This allows determining a knowledge contribution for each piece of knowledge. For example, take a query which asks for all entities falling in category A but not in category B. Say data provided by data source 1 states that an entity X is in category A and data provided by data source 2 states that the same entity X is in both category A and category B. The data provided by data source 2 does not provide values for the attributes for entity X to the data subset as the data provided by data source 2 states that the entity X is in category B. However, the knowledge contribution of the data provided by data source 2 that the entity X is in category B is considered for the contribution of the data provided by data source 1 which does not include the knowledge that the entity X is in category B. The method can remove the values for the attributes for the entity X from the data subset provided by the data provided by data source 1 as the data provided by data source 2 provides the knowledge that the entity X is in category B. Hence, in this scenario the data provided by data source 2 can be counted as contributing knowledge to the data subset provided based on the query for all entities falling in category A but not in category B for entity X.

The method can comprise the step:
providing, by the one or more processors, a priority score to each data source for each attribute based on one or more priority parameters. Assigning the data lineages to the values for the attributes can be performed additionally based on the priority scores.

The data lineages can for example be assigned to the values for the attributes such that the data source identifiers with the highest priority scores for the attributes are assigned to the values for the attributes. The priority parameters can for example include data correctness, recency, variety, redundancy, conflicts, scale, density, on target reach (OTR), CTR, attribute usage, and/or uniqueness. The priority parameters can furthermore include demographic factors, such as a country or location. Assigning the data lineages to the values for the attributes additionally based on the priority scores can allow for an improved data lineage management in cases that same values or different conflicting values for the attributes are provided from different data sources. Furthermore, this can allow values for the attributes in the dataset to be more up-to-date, e.g., in case that recency is considered as priority parameter. Furthermore, changes of values for the attributes over time can be easily considered.

Data correctness can be defined as a probability for a value for an attribute to correspond to its true measurable value. Data correctness can for example be denoted by a value of data correctness between 0 and 1, with 1 standing for 100% data correctness. For 100% data correctness, for example, each value corresponds to its true measurable value. The data correctness can be associated to a respective data source and correspond to an average data correctness of data such as values for the attributes provided from the respective data source. Alternatively, a value of data correctness can be specifically assigned to a respective attribute or respective value for the respective attribute received from a respective data source. Typically, errors occur while storing or transferring data, such that values for attributes can be incorrect. Furthermore, over time true values for the attributes may change, such that the values in the dataset become outdated and/or incorrect. Therefore, typically, data sources provide values for attributes with a data correctness value below 1. In case that only data correctness is considered for providing the priority score, the data correctness value can be used as priority score. The priority score can also for example be a weighted and normalized sum of values of the priority parameters. This can allow to adjust the influence of different priority parameters on the priority score and thus the data lineages and eventually the distribution of shares of resources.

Recency can be determined based on a publication date or timestamp associated with a value for an attribute. Recency corresponds to how recently data, such as the values for the attributes, was published. Variety corresponds to a number of different types of attributes provided by a data source. Redundancy corresponds to an amount of overlap with data, e.g., values for attributes in the dataset or received from other data sources or overlap with other data sources, or overlap with the same data source across time. Conflicts corresponds to an amount of values for attributes that have conflicts as different values for the attributes assigned to the same identifier are provided from different data sources. Scale corresponds to a data volume provided by a data source. Density corresponds to a number of attributes with values. OTR corresponds to a percentage of correctly identified targets, such as identifiers, in an ad tech campaign. OTR can be a proxy for data correctness. CTR can be a measure of success of an ad tech campaign. CTR can be a proxy for performance. Attribute usage can correspond to a number of times an attribute was used in a certain time period. Location can correspond to a city, post code region, coordinates, or any other location. Uniqueness can correspond to a cardinality of the values for the attributes.

Providing, by the one or more processors, the priority score to each data source for each attribute can be performed based on heuristic rules or a ML model which optimizes the priority score based on the one or more priority parameters. Heuristic rules can for example include that data sources with identification verified datasets have a higher priority score than data sources without identification verified datasets. Identification verified datasets are datasets that include values for attributes that are provided based on a verified identification. Identifications used for verification of the values for the attributes can for example include passports or driving licenses of users. Heuristic rules can for example include that certified data sources have a higher priority score than data sources without certification. Data sources can for example be certified by external entities, such as by the International Organization for Standardization (ISO). Heuristic rules can for example include that the priority score of data sources is based on recency of the values for the attributes provided by the data sources. The priority score of a value for an attribute can be higher when its timestamp is younger than the timestamp of another value for the attribute. Heuristic rules can for example include that the priority scores of data sources that more frequently provide data have a higher value than data sources which less frequently provide data.

The heuristic rules can be combined and weighted in order to determine a priority score of the data sources for each attribute. The heuristic rules can also be used as a feature set for the ML model in order to generate a dynamic model. The heuristic rules and the ML model can be extensible, i.e., they can be adapted such that further rules and respectively features can be added.

Providing, by the one or more processors, the priority score to each data source for each attribute can be performed additionally based on an event trigger or a time trigger. The event trigger can for example be that a threshold amount of values for the attributes changes. The time trigger can for example be based on a threshold duration between the last time the priority score was provided and a current point in time. This allows updating the priority scores in certain time intervals or when a certain event occurs. Furthermore, different versions of the dataset can be used in connection with the event trigger and the time trigger, such that different versions of the dataset are generated whenever the event trigger or time trigger is activated.

Different versions of the dataset can correspond to datasets at different points in time. The different versions of the datasets can for example be stored, e.g., in the data storage. A new version of the dataset can for example be generated, when new values for attributes are received and blended into a previous version of the dataset. The new values for the attributes can have different values and/or they can have different priority scores than the previously stored values for the attributes, such that the values for the attributes in the new version of the dataset can be different to the values for the attributes of the previous version of the dataset. Different versions of the dataset can be stored for a predetermined time or until a respective version is deleted. Storing different versions of the dataset can allow to provide knowledge contributions and data usage for older versions of the dataset. For example, shares of resources for the data sources for an old query can be determined based on processing a respective old version of the dataset that was the current version of the dataset at the time when the query was received. This can allow an improved analysis, e.g., in case that resource distribution to the data sources changes over time. Furthermore, this can allow improved processing, such as parallel processing of a query during receiving of newer values for attributes as the query can be processed based on the previous dataset in case that the new dataset is not updated with the values for the attributes yet.

The method can comprise the step:
  assigning, by the one or more processors, a respective value for a respective attribute received from a respective data source to a respective identifier based on the priority score of the respective data source for the respective attribute.

This allows assigning only single values for the attributes to respective identifiers in case of conflicting values received by different data sources. This allows to resolve conflicts, for example if two data sources provide different values for the same attribute to a respective identifier, e.g., in case of gender, one provides female and the other data source provides male. This can furthermore allow to increase the influence of the priority parameters, e.g., in case that recency has a higher influence on the priority score, the values will be more up-to-date, and in case that data correctness has a higher influence on the priority score, the values will have a higher data correctness.

Assigning a respective value for a respective attribute received from a respective data source to a respective identifier based on the priority score of the respective data source for the respective attribute can be performed by assigning a respective value for a respective attribute with a highest priority score to the respective identifier. Selecting the value with the highest priority score allows to solve conflicts and to select a single value for an attribute.

The method can comprise the steps:
  providing, by the one or more processors, the data subset to a data target and
  receiving resources from the data target.

The data target can for example be a server. The data target can for example be configured for providing a certain amount of resources, such as a predetermined amount of resources based on the data subset. The data target can for example provide an amount of resources based on one or more data subset parameters such as the size, data correctness, recency, or other data subset parameter of the data subset. The data target can for example provide resources based on market negotiation mechanisms. For example, a fixed amount of resources can be provided per time period, a fixed amount of resources can be provided for each query, an amount of resources can be provided in dependence of a number of cells of the data subset, or any other mechanism for providing resources. The resources can for example be processing time, energy, or revenue.

The method can comprise the step:
  distributing the shares of the resources to the different data sources.

This can allow to optimize the interaction between data sources and data targets and improve tasks performed by the data targets. For example, data targets require data, such as values for attributes to perform tasks, e.g. providing advertisements to user devices, providing forecasts, such as weather forecasts, energy supply and demand forecasts for managing energy distribution systems, or any other task which benefit from optimized interaction between data sources and data targets. A performance of a data subset for a data target received from the resource distribution data system can for example depend on the data correctness or recency of the data.

In particular, in case of advertisements provided to user devices, the performance is higher if the CTR is higher. The CTR is generally higher, when the OTR and thus the data correctness is higher.

In case of weather forecasts, accuracy of forecasted weather depends on correctness of weather data, such as values for attributes such as humidity, pressure, and temperature provided by data sources in form of weather stations. Since data sources with higher knowledge contribution receive larger shares of resources, they can provide better and/or more values for attributes. At least data sources which receive larger shares of resources have a higher probability to keep on providing data. For example, sensors of weather stations can be provided with energy in order to measure weather data. When certain data sources, e.g. weather stations provide data with higher data correctness and others provide data with lower data correctness, the data sources with lower data correctness will provide less knowledge to the data subset and thus the data sources will be provided with less resources. Hence, high knowledge contributing data sources can be enhanced in order to improve data correctness of the data subset over time. The accuracy of the weather forecast may also besides data correctness depend on a location of the weather station. For example, receiving weather data only from a limited region with high density of data points results in a lower performance than receiving data from more evenly distributed data points.

A priority score may depend on data correctness and location of the data source, such that the method allows an optimization of the dataset and data subset over time by enhancing the data sources that contribute more knowledge by providing them with a larger share of the resources.

In a further aspect a resource distribution data system for distributing resources is presented.

The resource distribution data system comprises one or more memory components having computer readable code stored thereon and one or more processors operatively coupled to the one or more memory components and configured to execute the computer readable code. The computer readable code includes receiving values for attributes associated to respective identifiers from a plurality of different data sources, blending the received values for the attributes into a dataset, such that the dataset includes a plurality of identifiers and one or more values for one or more attributes are assigned to each of the identifiers, assigning data lineages to the values for the attributes based on the data source from which a respective value for a respective attribute was received, receiving a query for providing a data subset of the dataset based on one or more of the attributes, providing the data subset based on the query, determining a knowledge contribution of each of the data sources to the data subset based on the data lineages of the values for the attributes included in the dataset relevant for the query, and sending control signals to a network, said control signals instructing a distribution of shares of resources to the different data sources based on the knowledge contribution of each of the data sources to the data subset.

The resource distribution data system provides the same advantages as described in connection with the method for distributing resources.

The resource distribution data system may be configured for receiving values for attributes associated to respective identifiers from a plurality of different data sources and for blending the received values for the attributes into a dataset, such that the dataset includes a plurality of identifiers and one or more values for one or more attributes are assigned to each of the identifiers. The resource distribution data system may comprise a data lineage unit, a query receiving unit, a data subset providing unit, a knowledge contribution unit, and a resource distribution unit. The data lineage unit may be configured for assigning data lineages to the values for the attributes based on the data source from which a respective value for a respective attribute was received. The query receiving unit may be configured for receiving a query for providing a data subset of the dataset based on one or more of the attributes. The data subset providing unit may be configured for providing the data subset based on the query. The knowledge contribution unit may be configured for determining a knowledge contribution of each of the data sources to the data subset based on the data lineages of the values for the attributes included in the dataset relevant for the query. The resource distribution unit may be configured for determining shares of resources to be distributed to the different data sources based on the knowledge contribution of each of the data sources to the data subset.

When the knowledge contribution unit is configured for determining a knowledge contribution of each of the data sources to the data subset based on the data lineages of the values for the attributes included in the dataset relevant for the query, and the resource distribution unit is configured for determining shares of resources to be distributed to the different data sources based on the knowledge contribution of each of the data sources to the data subset, the resource distribution data system can determine shares of resources to be distributed to the different data sources without measuring a data flow to data targets. This allows to distribute shares of resources without a step of metering the data flow. This furthermore allows reproducibly determining a knowledge contribution and distributing resources based on the knowledge contribution to the data sources at the attribute level. The resource distribution data system allows providing resources to the data sources with a same proportion as that of their knowledge contribution into the data subset. A larger knowledge contribution of a data source results in a larger share of resources. The resource distribution data system allows to determine knowledge contribution without manual reconciliation. This can allow to increase the number of data sources that can be handled by the resource distribution data system. Furthermore, the resource distribution data system can allow to increase processing speed for determining and distributing resources to different data sources. Additionally, the resource distribution data system can allow to determine the shares of resources to be distributed to the different data sources with a higher accuracy.

The query receiving unit can comprise or be connected to a transceiver for receiving the query. The transceiver can additionally be configured for receiving and transmitting data, such as the values for the attributes, data subsets, and shares of resources. The query can be generated from an external entity, e.g., an external server which can be connected to the resource distribution data system. The external entity can for example be the data target to which the data subset is to be provided. The resource distribution data system can alternatively comprise a query unit for generating the query. The query unit can comprise a user interface. The user interface can be configured for allowing an interaction with a user, such that the user can input queries.

The data subset providing unit can be configured for providing the data subset by blending the values for the attributes requested in the query into the data subset.

The resource distribution data system can comprise an attribute weighting unit configured for providing attribute weights to the attributes based on a type of a respective attribute. The resource distribution data system can comprise a data usage determination unit configured for determining a data usage of each of the data sources for the data subset based on the knowledge contribution of each of the data sources to the data subset and the attribute weights. The resource distribution unit can be configured for determining the shares of the resources to be distributed to the different data sources based on the data usage of each of the data sources for the data subset.

The resource distribution data system can comprise a data storage configured for storing the dataset, the data subset, or both. The data storage can for example be a computer readable medium, such as a memory. The data storage can be configured for storing the dataset and the data subset in form of a table with rows and columns. Each data source can store its data source identifier and provide its data source identifier when transmitting data to the transceiver of the resource distribution data system. The data lineage unit can be configured for adding a column entry with a respective data source identifier for each value for an attribute based on the data source from which the value was received. This allows to identify from which data source a respective value for an attribute was received and to provide data lineages to all values for the attributes.

The attribute weighting unit can be configured for providing a respective attribute weight to each of the attributes based on heuristic rules or a ML model which optimizes the attribute weights based on one or more attribute parameters. Attribute parameters can for example include a performance of the attribute. The attribute weighting unit can be configured for providing the attribute weight to each of the attributes based on a location and/or an application of the data subset.

The data usage determination unit can be configured for determining the data usage of each of the data sources for the data subset based on the formula:

$$U(k, q) = \frac{\sum_{j=0}^{n} N(k, j) \cdot W(j)}{\sum_{k=0}^{m} \sum_{j=0}^{n} N(k, j) \cdot W(j)},$$

with $U(k,q)$ a data usage of the data source k for query q, $N(k,j)$ a knowledge contribution of data source k to an attribute j, and $W(j)$ an attribute weight of the attribute j, n a number of attributes, and m a number of data sources.

The data lineage unit can be configured for assigning the received values for the attributes to cells of the dataset, such that each value for an attribute is a value for an atomic attribute included in one cell of the dataset and such that the values for the atomic attributes have identical data lineages as assigned to the values for the attributes.

The knowledge contribution unit can be configured for determining the knowledge contribution of each of the data sources to the data subset by counting a number of cells in the dataset that include a value for an atomic attribute with data lineage of a respective data source and which is relevant for the query for each of the data sources.

The resource distribution data system can comprise a priority scoring unit configured for providing a priority score to each data source for each attribute based on one or more priority parameters. The priority scoring unit can be included in the data lineage unit. The data lineage unit can be configured for assigning the data lineages to the values for the attributes additionally based on the priority scores. The data lineage unit can for example be configured for assigning the data lineages to the values for the attributes such that the data source identifiers of the data sources with the highest priority scores for the attributes are assigned to the values for the attributes.

The data lineage unit can be configured for assigning a respective value for a respective attribute received from a respective data source to a respective identifier based on the priority score of the respective data source for the respective attribute. The data lineage unit can for example be configured for assigning a respective value for a respective attribute with a highest priority score to a respective identifier. This allows to resolve conflicts.

The priority scoring unit can be configured for providing the priority score to each data source for each attribute based on heuristic rules or a ML model which optimizes the priority score based on the one or more priority parameters.

The priority scoring unit can be configured for providing the priority score to each data source for each attribute additionally based on an event trigger or a time trigger.

The data storage can also store or be configured for storing different versions of the dataset corresponding to different points in time. The data storage can be configured for storing different versions of the dataset for a predetermined time or until a respective version is deleted. Storing different versions of the dataset can allow to provide knowledge contributions and data usage for older versions of the dataset. This can allow an improved analysis. Furthermore, this can allow improved processing.

The transceiver of the resource distribution data system can be configured for providing the data subset to a data target and for receiving resources from the data target. The transceiver can additionally be configured for providing the shares of the resources to the different data sources.

In a further aspect of the present invention a computer program product for distributing resources is presented. The computer program product comprises program code means for causing the resource distribution data system according to claim 13 or any embodiment of the resource distribution data system to carry out the method as defined in at least one of the claims 1 to 12, when the computer program product is run on the resource distribution data system. Alternatively or additionally, the computer program product can comprise program code means for causing the resource distribution data system according to claim 13 or any embodiment of the resource distribution data system to carry out any embodiment of the method, when the computer program product is run on the resource distribution data system.

In a further aspect a computer readable medium having stored the computer program product of claim 15 is presented. Alternatively or additionally, the computer readable medium can have stored the computer program product according to any embodiment of the computer program product.

The present invention can for example be used in revenue data distribution to data sources in an advertisement tech data management platform (DMP) application. The present invention can also be used by any application that blends data received from different data sources and which provides this data to one or more data targets for further processing, such as for example forecasting, such as weather forecasting, traffic forecasting, energy demand and supply forecasting, or other forecasting. The blended data may also be sold to data targets. Further use-cases include revenue distribution, usage analytics, and forecasting of similar data. This can result in better analytics.

The method of claim 1, the resource distribution data system of claim 13, the computer program product of claim 14, and the computer readable medium of claim 15 can have similar and/or identical preferred embodiments, in particular, as defined in the dependent claims.

A preferred embodiment of the present invention can also be any combination of the dependent claims or above embodiments with the respective independent claim.

These and other aspects of the invention will be apparent from and elucidated with reference to the embodiments described hereinafter.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to methods and systems for resource distribution. In particular, the present invention, in some embodiments thereof, relates to a method for distributing resources and a resource distribution data system for distributing resources. The resources can be distributed based on data usage.

Figure 1:
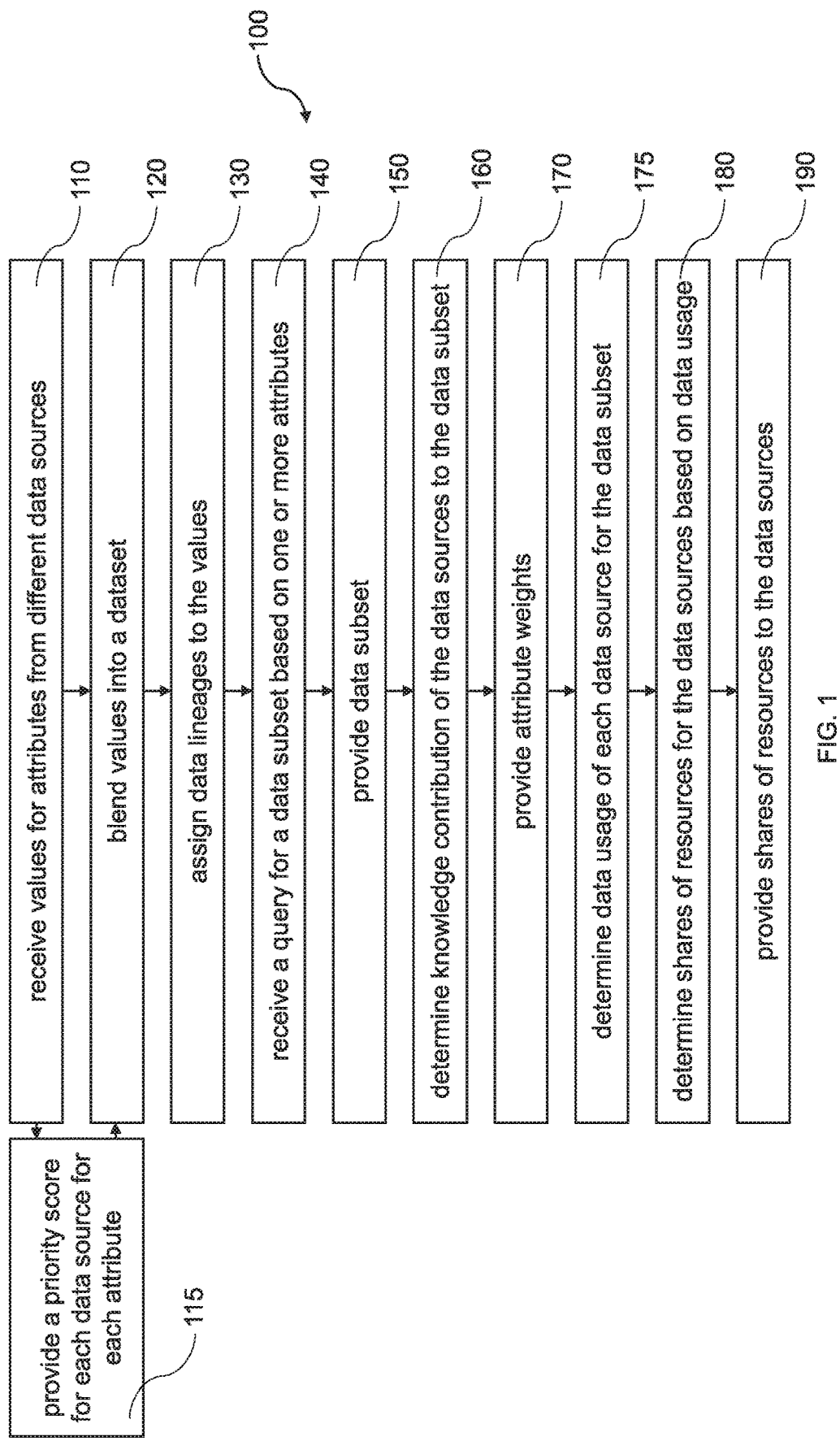
FIG. 1 shows schematically and exemplarily an embodiment of a method for distributing resources based on data usage.

In FIG. 1 an embodiment of a method 100 for distributing resources based on data usage is shown. In this embodiment, resources in form of revenue is distributed to different data sources based on data usage of data provided from the data sources. In this embodiment, the data sources are servers that provide their data to a resource distribution data system, e.g., the resource distribution data system 200 of FIG. 2 and/or resource distribution data system 300 of FIG. 3, which perform(s) the method 100. In other embodiments, other resources, e.g. energy, can be distributed to different data sources based on knowledge contribution or data usage of data provided from the data sources.

In step 110, values for attributes associated to respective identifiers are received, by one or more processors, from a plurality of different data sources. In this embodiment, the attributes include gender, age, country, language, vehicle, and usage of specific applications, such as Facebook and WhatsApp.

Values for gender can for example include a number which is associated to a gender, such as male, female, or diverse. For example, male can be associated to 1, female can be associated to 2, and diverse can be associated to 3. Alternatively, categorical values can be used for the gender attribute, e.g., male, female, and diverse. Values for age can for example be any positive integer value in years. Values for countries can for example include a number which is associated to a certain country, e.g., the United States of America is associated to 1. Alternatively, categorical values can be used for the country attribute, such as country codes. Values for language can for example include a number associated to a certain language, e.g., English is associated to 1. Alternatively, categorical values can be used for the language attribute, e.g., English, Chinese, Spanish, French, German, or any other language. Values for vehicle can for example include a number associated to a certain vehicle, e.g., a certain type of bicycle is associated to 1, a certain type of car is associated to 25, or the like. Alternatively, categorical values can be used for the vehicle attribute. Values for usage of specific applications can be 0 or 1 corresponding to true or false. Alternatively, true or false can be used as values for usage of specific applications. The values can be provided for each specific application including for example Facebook, WhatsApp or any other application.

The values for the attributes are associated to identifiers in form of unique identifiers, which uniquely identify a user account. In other embodiments, other unique identifiers can for example uniquely identify a user device, an instance, a server, or the like.

In this embodiment, the data received from the data sources is provided in form of tables with rows and columns, i.e., the values for the attributes are provided in different cells of the tables. In other embodiments, any other format for providing the data may be used, such as a row format, a columnar format, a document format, a text file format, an encrypted file format, a compressed format, or the like. Each user account is associated to a first column of a row, such that each row includes only one user account. The other columns of each row are filled with the values for the attributes. If no value for one or more of the attributes is provided for a certain user account, the respective column is left empty. Alternatively, the respective column can also be filled with a non-available value or a zero in case that zero is not associated to another value for the attribute.

Step 110 can be followed by step 115 or step 120. Step 115 is optional.

In step 115, a priority score is provided, by the one or more processors, to each data source for each attribute based on one or more priority parameters. In this embodiment, the priority parameters include data correctness and recency. In other embodiments, the priority parameters can furthermore include further or other priority parameters such as variety, redundancy, conflicts, scale, density, OTR, CTR, attribute usage, uniqueness, verification, and certification. Furthermore, the priority parameters in other embodiments can include demographic factors in form of country and location. In other embodiments, other priority parameters can be provided.

In this embodiment, the priority scores are provided, by the one or more processors, to each data source for each attribute using heuristic rules. For providing heuristic rules, in this embodiment drools version 6.5 is used. In other embodiments, heuristic rules can also be provided in any other manner, e.g., using another algorithm. Rules include attributes, threshold values for the attributes, and/or conditions. For example, rules can include that a specific priority score, e.g., 0.7 is assigned if the data source has a specific type, such as telecommunication data provider. Another rule can for example be, that a specific priority score, e.g., 0.4, is provided when a data source provides data within certain time intervals, such as within 3 days or less and that the amount of datasets provided is above a threshold value, e.g., 1 million datasets. Alternatively, the rules can also be formulas that provide continuous priority scores. In other embodiments, the priority scores can also be provided to the data sources for the attributes based on an ML model which optimizes the priority score based on the one or more priority parameters. The heuristic rules can for example be used as a feature set for the ML model in order to generate a dynamic model. The heuristic rules and the ML model can be extensible, i.e., they can be adapted such that further rules and respectively features can be added.

In this embodiment, two heuristic rules are provided. According to a first heuristic rule, the priority score for data sources for an attribute is higher if the data correctness is higher. The priority score is based on the data correctness, such that the data correctness in form of a probability score for the value to be correct is assigned as a first sub priority score $p_1$. According to a second heuristic rule, the priority score for data sources for an attribute is higher if the recency is higher. The priority score is based on the recency, such that a certain recency value corresponds to a certain second sub priority score $p_2$. In this embodiment, the second sub priority score $p_2$ is calculated by a function depending on the recency of the value for the attribute. Hence, the second sub priority score $p_2 = a/\Delta t$ with a weighting factor a and the difference $\Delta t$ between the current time and a timestamp of the value for the attribute. In other embodiments, the second sub priority score $p_2$ can also be determined based on a look up table (LUT).

The first sub priority score $p_1$ and the second sub priority score $p_2$ for a data source for an attribute are added as a weighted sum in order to determine the priority score for the data source for the attribute, i.e., p(data source X, attribute Y)=$w_1 p_1$(data source X, attribute Y)+$w_2 p_2$(data source X, attribute Y), with weighting factors $w_1$ and $w_2$. The priority scores for the data sources for each attribute can be determined in this manner. This allows to provide priority scores for the data sources for each attribute.

In other embodiments, heuristic rules can include that data sources with identification verified datasets have a higher priority score than data sources without identification verified datasets. If a data source provides identification verified values for attributes, the priority score is increased by a certain amount, e.g., 0.1. The heuristic rules can furthermore include that certified data sources have a higher priority score than data sources without certification. If a data source is certified the values for attributes provided by this data source are increased by a certain amount, e.g., 0.2. Data sources can for example be certified by external entities, such as by ISO. Additionally, the heuristic rules can include that the priority scores of data sources that more frequently provide data have a higher value than data sources which less frequently provide data. Each heuristic rule can provide a sub priority score for the data sources for each attribute. Some or all of the sub priority scores determined based of the heuristic rules can be combined and weighted in order to determine a priority score for the data sources for each attribute.

In this embodiment, the priority scores are stored, in one or more memory components, in a priority score table in which a data source identifier which uniquely identifies a data source is associated to each row, e.g., included in a certain column of the row, and the priority scores for the attributes are included in the other columns of the row. In order to determine the priority score of a data source for a certain attribute from the priority score table, the column for the certain attribute of the row with the data source identifier can be selected. In other embodiments, an additional column including the priority score can be added for each attribute.

In this embodiment, the priority score is provided, by the one or more processors, to each data source for each attribute whenever a value for an attribute is received. In other embodiments, providing the priority score to each data source for each attribute can also be performed additionally based on another event trigger or a time trigger. An event trigger can for example be that a certain number of values for attributes has been received. A time trigger can for example be that a certain period of time since the last time priority scores have been provided has passed.

The priority scores can be used for handling conflicts such as cases in which different values for attributes are provided from different data sources. In this embodiment, only the value with the highest priority score is considered. In other embodiments, the value for the attribute can be considered based on the priority score in any other manner.

In step 120, the received values for the attributes are blended, by the one or more processors, into a dataset, such that the dataset includes a plurality of identifiers and one or more values for one or more attributes are assigned to each of the identifiers.

In the dataset, each identifier is assigned to a first column of a row and the values for the attributes assigned to a certain identifier are assigned to the other columns of the row of the certain identifier. In other embodiments, the values for the attributes can be additionally divided into values for atomic attributes for those attributes that can be further divided. In this embodiment, all attributes are atomic attributes, such that each value for the attribute is stored in a cell of an atomic attribute.

In this embodiment, a respective value for a respective attribute received, by the one or more processors, from a respective data source is assigned to a respective identifier based on the priority score of the respective data source for the respective attribute. In particular, the value for the attribute with the highest priority score is assigned to the respective identifier, i.e., added in a cell of one of the columns of the row of the identifier. In other embodiments, conflict handling can also be performed in any other manner. For example, all priority scores for the values for the attributes received from different data sources can be stored in different columns of the row of the identifier associated to the values for the attributes. In that case, a single value of the stored values for the attribute can later be selected based on the priority scores or another selection mechanism.

In step 130, data lineages are assigned, by the one or more processors, to the values for the attributes based on the data source from which a respective value for a respective attribute was received. In this embodiment, a column that includes the data source identifier from which the value was received is added for the value for each attribute.

In this embodiment, the assigning of the data lineages to the values for the attributes is performed additionally based on the priority scores. Therefore, the column with the data source identifiers is filled with the data source identifier of the data source with the highest priority score. In other embodiments, e.g., in case that no priority score has been determined in step 115, the data lineages can be assigned without considering the priority scores.

In other embodiments, in which values for attributes are split into values for atomic attributes, the received values for the attributes are assigned to cells of the dataset, such that each value for an attribute is a value for an atomic attribute included in one cell of the dataset and such that the values for the atomic attributes have identical data lineages as assigned to the values for the attributes from which they are derived, i.e., the column with the data source identifier is associated to all columns with values for the atomic attributes derived from the attributes.

In step 140, a query for providing a data subset of the dataset based on one or more of the attributes is received. In this embodiment, the query is received from a data target requesting a data subset with values for attributes based on a selection of predicates.

An exemplary query can for example request a data subset that includes all unique identifiers that have a value of the gender attribute that is female and a value of the age attribute between 18 and 24 years. This allows to limit the data included in the data subset based on the requested attributes.

In step 150, the data subset is provided based on the query. Therefore, the values for the attributes requested in the query are added into a table forming the data subset.

For the exemplary query, the table forming the data subset is filled with the unique identifiers that have a value for the gender attribute that is female and a value for the age attribute between 18 and 24 years. The data subset is then provided to the data target by transmitting it wirelessly.

In step 160, a knowledge contribution of each of the data sources to the data subset is determined, by the one or more processors, based on the data lineages of the values for the attributes included in the dataset relevant for the query. Therefore, a number of cells in the dataset is counted that include a value for an atomic attribute with data lineage of a respective data source and which is relevant for the query for each of the data sources. A cell is relevant for the query, if a decision to add data to the data subset is based on the knowledge provided by the cell.

In step 170, attribute weights are provided, by one or more processors, to the attributes based on a type of a respective attribute. In this embodiment, a respective attribute weight is provided to each of the attributes based on heuristic rules. In other embodiments, a ML model can be provided which optimizes the attribute weights based on one or more attribute parameters. Attribute parameters can for example include a performance of the attribute or attribute usage. The heuristic rules can be used as a feature set for the ML model in order to generate a dynamic model. The heuristic rules and the ML model can be extensible, i.e., they can be adapted such that further rules and respectively features can be added.

The heuristic rules include that a higher attribute usage has a higher attribute weight. Initially, all attribute weights can be equal, e.g., 0.5 of 1. Over time, the method 100 learns an attribute weight by determining which attributes are requested in queries, such that attributes that are more frequently requested receive higher attribute weights, e.g., above 0.5, such as 0.8 and attributes that are less frequently requested receive lower attribute weights, e.g., below 0.5, such as 0.2. In other embodiments, the heuristic rules can for example include that a higher attribute usage within a certain time period, e.g. within the last 10 days, has a higher weight. The heuristic rules can include that for user accounts from India the language attribute has a higher attribute weight, e.g., 0.6 of 1. The heuristic rules can include other and/or additional rules for providing attribute weights. The heuristic rules can include that application usage attributes have a higher attribute weight in the United States of America. The heuristic rules can include that vehicle related attributes have a higher attribute weight in Spain.

The heuristic rules can be weighted and combined in order to determine an attribute weight for each of the attributes.

In step 175, a data usage of each of the data sources for the data subset is determined, by one or more processors, based on the knowledge contribution of each of the data sources to the data subset and the attribute weights. In this embodiment, the data usage of each of the data sources for the data subset is determined based on the formula:

$$U(k, q) = \frac{\sum_{j=0}^{n} N(k, j) \cdot W(j)}{\sum_{k=0}^{m} \sum_{j=0}^{n} N(k, j) \cdot W(j)},$$

with U(k,q) a data usage of the data source k for query q, N(k,j) a knowledge contribution of data source k to an attribute j, and W(j) an attribute weight of the attribute j, n a number of attributes, and m a number of data sources.

In step 180, instructing, by the one or more processors, a distribution of shares of resources to the different data sources based on the data usage of each of the data sources for the data subset is performed. In this embodiment, a respective share of the resources to be distributed to a respective data source corresponds to its data usage divided by a total data usage. The total data usage is determined by summing the data usages of all data sources. In this embodiment, the resources are revenue.

Steps 170 and 175 are optional. In other embodiments, in which no attribute weights are determined, the shares of resources to be distributed to the different data sources can also be determined based on the knowledge contribution of each of the data sources to the data subset. Furthermore, resources can also be processing power, energy, or any other resource.

In step 190, resources are received from the data target. The shares of the resources as determined in step 180 are provided to the different data sources by transmitting them to the data sources.

According to some embodiments of the present invention resources may be a revenue from an activity, such as selling goods or information or a service. Resources may also be a processing power resource, such as processing power of a processor, or a server. The resources can furthermore include data, such as system logs or records. Resources may also be an energy generated by renewable energy sources, non-renewable energy sources and/or energy storage systems, such as photovoltaic systems (PV), fuel cells, batteries or superconducting magnetic energy storage systems (SMES). The resources may be allocated by the resource distribution data system and redistributed based on the knowledge contribution of each of the data sources to the data subset.

The resource distribution data system may be configured to allocate the resources or to keep them ready for distribution. Further, the resource distribution data system may be configured to grant access to a share of resources or to issue a transfer of shares of resources from the data target or a third location to the data sources.

In case the shares of resources are including a revenue, the resource distribution data system may receive the revenue in the form of a financial transaction and order a financial transaction to divide shares of revenue to the different data sources based on the knowledge contribution of each of the data sources to the data subset. The resource distribution data system may send according control signals to a server that issues the financial transaction.

In case the shares of resources are including processing power, the resource distribution data system may grant access to an IT-infrastructure, which may comprise access to memory, processing power, or software as a service (SaaS). Said IT-infrastructure may be included in the resource distribution data system or in the data target, or in a third location.

In case the shares of resources are including energy, the resource distribution data system may issue a transfer of energy to the data sources. Said energy may be sourced in from the data target, the resource distribution data system or a third location that may provide energy. The energy may be any form of transferrable energy, such as renewable or non-renewable energy, electric energy or fossil fuel.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 2:
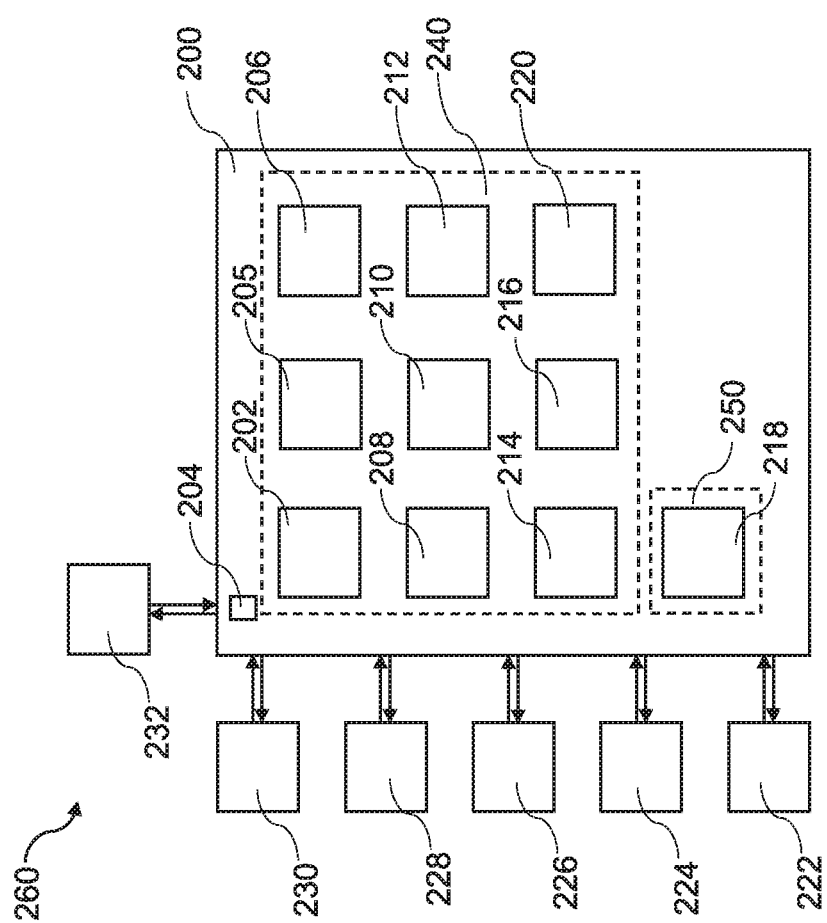
FIG. 2 shows schematically and exemplarily an embodiment of a resource distribution data system.

In FIG. 2 an embodiment of a resource distribution data system in form of a revenue attribution system 200 for distributing resources in form of revenue is schematically and exemplarily shown. In other embodiments, the resource distribution data system can for example be a forecast system for distributing processing power or energy, such as a weather forecast system, a traffic forecast system, or an energy demand and supply forecast system.

The revenue attribution system 200 comprises a query receiving unit 202 connected to a transceiver 204. In other embodiments, the query receiving unit can also include a transceiver. Furthermore, the revenue attribution system 200 comprises a data processing unit 205, a data lineage unit 206, a data subset providing unit 208, a knowledge contribution unit 210, a resource distribution unit 212, an attribute weighting unit 214, a data usage determination unit 216, a computer readable medium in form of data storage 218, a processor 240, a memory component 250 and a priority scoring unit 220. In other embodiments, the resource distribution data system may also include more than one processor and/or more than one memory component. The attribute weighting unit 214, the data usage determination unit 216, the data storage 218, and the priority scoring unit 220 are optional.

In this embodiment, the query receiving unit 202, the data processing unit 205, the data lineage unit 206, the data subset providing unit 208, the knowledge contribution unit 210, the resource distribution unit 212, the attribute weighting unit 214, the data usage determination unit 216, and the priority scoring unit 220 are configured as software running on the processor 240. In other embodiments, the query receiving unit, the data processing unit, the data lineage unit, the data subset providing unit, the knowledge contribution unit, the resource distribution unit, the attribute weighting unit, the data usage determination unit, and/or the priority scoring unit may also be configured as software running on one or more processors or a firmware running on a microchip of the resource distribution data system. In this embodiment, the memory component 250 has computer readable code stored thereon and the processors 240 is operatively coupled to the memory component 250 and configured to execute computer readable code. In this embodiment, the data storage 218 is part of the one or more memory components 250. In other embodiments, the data storage may also be a separate component.

The transceiver 204 may be a hardware component configured to send and receive signals, data and/or shares of resources from/to a data target 232 and/or data sources 222, 224, 226, 228, and 230. The transceiver 204 may be a part of a network 260 or have an interface connected to a network 260, through which control signals instructing a distribution of shares of resources may be sent and/or received. The transceiver 204 may be a hardware component dedicated for these tasks. The transceiver 204 may also be configured for performing other tasks, e.g., sending and receiving other signals and data. The transceiver 204 may also be a software module and/or firmware module configured to operate a corresponding hardware component configured to send and receive signals, data and/or shares of resources from/to the data target 232 and/or the data sources 222, 224, 226, 228, and 230.

Alternatively, these units, the computer readable medium in form of data storage 218 and/or the transceiver 204 may be configured as standalone computer systems or as a part of a standalone computer system. The units of the revenue attribution system 200, the computer readable medium in form of data storage 218 and the transceiver 204 may be connected to each other via a network 260, such as the internet or a local, metropolitan or wide area network. The units of the revenue attribution system 200, the computer readable medium in form of data storage 218 and the transceiver 204 may include modules for a connection by wire or a wireless connection.

The revenue attribution system 200 may be configured as a server that is in connection to the data sources 222, 224, 226, 228, and 230 and the data target 232. The server may be a software that is in connection with the data sources 222, 224, 226, 228, and 230 and the data target 232 as a host, managing the data sources 222, 224, 226, 228, and 230 and the data target 232 as clients. Also, the server may be a hardware component in the form of a network host computer.

In this embodiment, the revenue attribution system 200 is connected to the data sources 222, 224, 226, 228, and 230 and the data target 232. In this embodiment, data sources 222, 224, 226, 228, and 230 and data target 232 are servers. The data sources 222, 224, 226, 228, and 230 provide data in form of values for attributes and the data target 232 requests data from the revenue attribution system 200 in form of data subsets of a dataset stored in the data storage 218 of the revenue attribution system 200.

The connection between the revenue attribution system 200 and the data sources may be established in a network 260, such as a local, metropolitan or wide area network. The revenue attribution system may include modules for a connection by wire or a wireless connection. The transceiver 204 receives and transmits data such as values for attributes, data subsets, shares of resources, and queries. In particular, the transceiver 204 receives values for attributes associated to respective identifiers from the plurality of different data sources 222, 224, 226, 228, and 230. Each data source 222, 224, 226, 228, and 230 stores a data source identifier to uniquely identify the data source and provides its data source identifier when transmitting data to the transceiver 204.

The received values for the attributes are blended into a dataset by the data processing unit 205 such that the dataset includes a plurality of identifiers and one or more values for one or more attributes are assigned to each of the identifiers. In this embodiment, the dataset is provided in form of tables with rows and columns, i.e., the values for the attributes are provided in different cells of a table. In other embodiments, any other format may be used. Each identifier in form of a user account is associated to the first column of a row.

The other columns of each row are filled with the values for the attributes. If no value for one or more of the attributes is provided for a certain user account, the respective column is left empty.

The priority scoring unit 220 provides a priority score to each data source for each attribute based on one or more priority parameters. The priority scoring unit can in other embodiments be included in the data lineage unit.

In this embodiment, the priority scoring unit 220 provides the priority score to each data source for each attribute based on heuristic rules. In other embodiments, the priority scoring unit can also be configured for providing the priority score to each data source for each attribute based on a ML model which optimizes the priority score based on the one or more priority parameters. In this embodiment, according to the heuristic rule the priority score for a value for an attribute correspond to its data correctness. In other embodiments, other or additional heuristic rules can be provided. The data correctness can be provided by the data source. The data correctnesses of the values for the attributes can for example be determined by externally testing it, e.g., using a panel based method or any other method known in the art for determining data correctness. In a panel based method, a panel includes identifiers of which the values for the attributes are known. The values for the attributes can be checked against the panel, e.g., it can be determined whether a data subset includes correct data with respect to the data requested by a corresponding query.

In this embodiment, the priority scoring unit 220 determines the priority score whenever a value for an attribute is received from one of the data sources 222, 224, 226, 228, and 230. In other embodiments, the priority scoring unit can also be configured for providing the priority score to each data source for each attribute based on any other event trigger or a time trigger.

The data lineage unit 206 assigns a respective value for a respective attribute received from a respective data source 222, 224, 226, 228, and 230 to a respective identifier based on the priority score of the respective data source 222, 224, 226, 228, and 230 for the respective attribute. In this embodiment, the data lineage unit 206 assigns a respective value for a respective attribute with a highest priority score to a respective identifier. This allows to resolve conflicts. For example, if two different values are provided from two different data sources, the value with the higher priority score is assigned to the respective identifier and the other value is not considered. In other embodiments, the values provided by each of the data sources may be assigned to the respective identifier and stored in cells of different columns.

The data lineage unit 206 assigns data lineages to the values for the attributes based on the data source 222, 224, 226, 228, and 230 from which a respective value for a respective attribute was received and additionally based on the priority scores. In this embodiment, the data lineage unit 206 assigns the data lineages to the values for the attributes such that the data source identifiers of the data sources 222, 224, 226, 228, and 230 with the highest priority scores for the attributes are assigned to the values for the attributes. The data lineage unit 206, therefore adds a column entry with a respective data source identifier for the value for an attribute based on the data source 222, 224, 226, 228, and 230 from which the value was received and which has the highest priority score. This allows to identify from which data source 222, 224, 226, 228, and 230 a respective value for an attribute was received and to provide data lineages to all values for the attributes. The data lineage unit 206 assigns the received values for the attributes to cells of the dataset, such that each value for an attribute is a value for an atomic attribute included in one cell of the dataset and such that the values for the atomic attributes have identical data lineages as assigned to the values for the attributes.

In other embodiments, the data lineage unit can be configured for assigning the data lineages to the values for the attributes based on the data source from which a respective value for a respective attribute was received without considering the priority scores. The data lineage unit can in this case add a column entry with a respective data source identifier for each value for an attribute based on the data source from which the value was received.

The transceiver 204 furthermore receives queries for providing a data subset of the dataset based on one or more of the attributes. The query is received from the data target 232.

The data subset providing unit 208 provides the data subset based on the query. The data subset providing unit 208 provides the data subset by blending the values for the attributes requested in the query into the data subset.

The transceiver 204 transmits the data subset to the data target 232.

The data storage 218 stores the dataset and the data subset. In this embodiment, the data storage 218 stores the dataset and the data subset in form of a table with rows and columns. Furthermore, in this embodiment, the data storage 218 stores different versions of the dataset and the data subset generated at different points in time. In this embodiment, the different versions are stored until they are manually deleted. In other embodiments, the different versions may be stored for a certain time or until a certain event occurs, e.g., when free storage is below a certain percentage. Storing different versions of the dataset can allow to provide knowledge contributions and data usage for older versions of the dataset. This can allow an improved analysis. Furthermore, this can allow improved processing.

Additionally, the data storage 218 stores a computer program product for distributing resources in form of revenue to the data sources 222, 224, 226, 228, and 230 based on data usage. The computer program product comprises program code means for causing the revenue attribution system 200 to carry out a method for distributing revenue to different data sources based on data usage, when the computer program product is run on the revenue attribution system 200. The method for distributing revenue can for example be the method 100 presented with respect to FIG. 1.

The knowledge contribution unit 210 determines a knowledge contribution of each of the data sources 222, 224, 226, 228, and 230 to the data subset based on the data lineages of the values for the attributes included in the dataset relevant for the query. The knowledge contribution unit 210 determines the knowledge contribution of each of the data sources to the data subset by counting a number of cells in the dataset that include a value for an atomic attribute with data lineage of a respective data source and which is relevant for the query for each of the data sources 222, 224, 226, 228, and 230.

The attribute weighting unit 214 provides attribute weights to the attributes based on a type of a respective attribute. The attribute weighting unit 214 provides a respective attribute weight to each of the attributes based on heuristic rules. In other embodiments a ML model which optimizes the attribute weights based on one or more attribute parameters can be provided. Attribute parameters can for example include a performance of the attribute. In other embodiments, the attribute weighting unit can be configured for providing the attribute weight to each of the attributes based on a location and/or an application of the data subset.

The data usage determination unit 216 determines a data usage of each of the data sources for the data subset based on the knowledge contribution of each of the data sources to the data subset and the attribute weights. The data usage determination unit 216 determines the data usage of each of the data sources for the data subset based on the formula:

$$U(k, q) = \frac{\sum_{j=0}^{n} N(k, j) \cdot W(j)}{\sum_{k=0}^{m} \sum_{j=0}^{n} N(k, j) \cdot W(j)},$$

with U(k,q) a data usage of the data source k for query q, N(k,j) a knowledge contribution of data source k to an attribute j, W(j) an attribute weight of the attribute j, n a number of attributes, and m a number of data sources.

The resource distribution unit 212 determines the shares of the resources to be distributed to the different data sources 222, 224, 226, 228, and 230 based on the data usage of each of the data sources for the data subset. In this embodiment, each share corresponds to the data usage of a data source 222, 224, 226, 228 or 230 divided by the total data usage, i.e., the data usage of all data sources 222, 224, 226, 228, and 230.

The transceiver 204 receives resources from the data target 232 and provides the shares of the resources as determined by the resource distribution unit 212 to the different data sources 222, 224, 226, 228, and 230.

Figure 3:
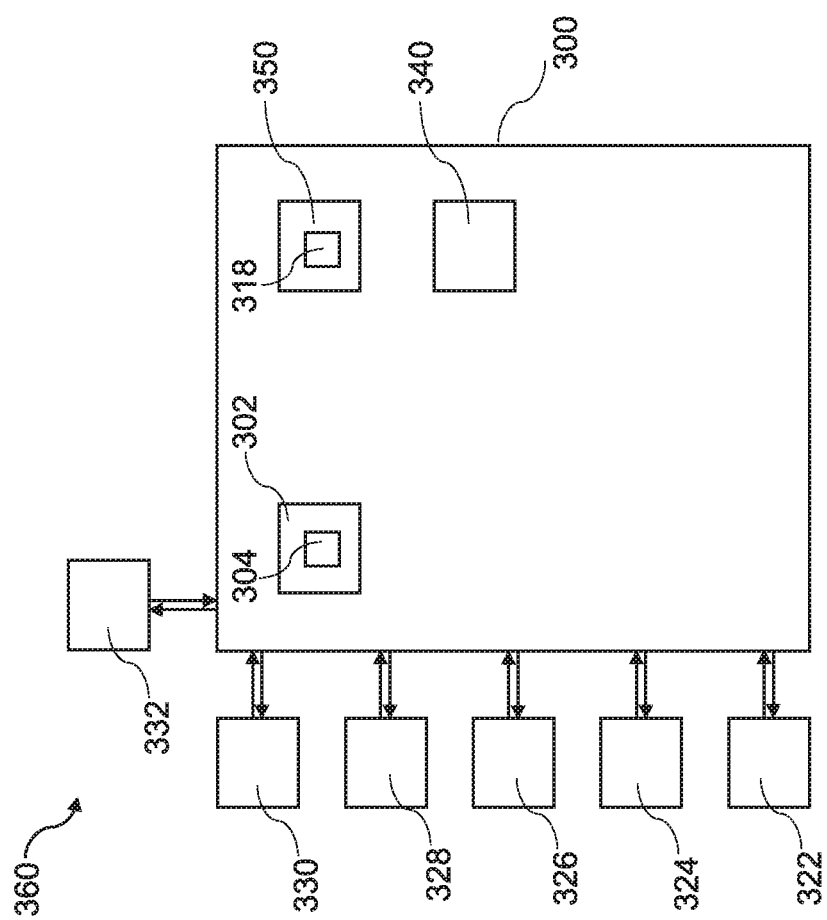
FIG. 3 shows schematically and exemplarily another embodiment of a resource distribution data system.

In FIG. 3, an embodiment of a resource distribution data system in form of a revenue attribution system 300 including one or more processors 340 for distributing resources in form of revenue is schematically and exemplarily shown. The revenue attribution system 300 includes a query receiving unit 302 including a transceiver 304. The transceiver 304 receives values for attributes associated to respective identifiers from a plurality of different data sources 322, 324, 326, 328, and 330 and provides them to the one or more processors 340 for processing them.

In this embodiment, the revenue attribution system 300 comprises one or more memory components 350 having computer readable code stored thereon and one or more processors 340 operatively coupled to the one or more memory components 350 and configured to execute the computer readable code for:

receiving values for attributes associated to respective identifiers from a plurality of different data sources 322, 324, 326, 328 and 330, blending the received values for the attributes into a dataset, such that the dataset includes a plurality of identifiers and one or more values for one or more attributes are assigned to each of the identifiers, assigning data lineages to the values for the attributes based on the data source from which a respective value for a respective attribute was received, receiving a query for providing a data subset of the dataset based on one or more of the attributes, providing the data subset based on the query, determining a knowledge contribution of each of the data sources to the data subset based on the data lineages of the values for the attributes included in the dataset relevant for the query, and sending control signals to a network 360, said control signals instructing a distribution of shares of resources to the different data sources 322, 324, 326, 328 and 330 based on the knowledge contribution of each of the data sources 322, 324, 326, 328 and 330 to the data subset.

In this embodiment, the control signals are send to the network 360 via the transceiver 304. The one or more processors 340 may run software modules and/or may send control signals to hardware components. In particular, the one or more processors 340 may control the transceiver 340 to receive values for attributes associated to respective identifiers from a plurality of different data sources 322, 324, 326, and 330.

In addition, the revenue attribution system 300 may comprise a computer readable medium in form of a data storage 318. The data storage 318 may store the dataset and the data subset. FIG. 3 illustrates the one or more memory components 350 as including the data storage 318. The data storage 318 may also be a separate part.

The invention has been illustrated and described in detail in the drawings and foregoing description. This illustration and description is to be considered illustrative or exemplary and not restrictive, i.e., the invention is not limited to the disclosed embodiments. For example, the invention can also be operated in an embodiment wherein the method and resource distribution data system are directed to forecasting, such as weather forecasting or traffic forecasting. The invention can also be operated in an embodiment wherein the method and resource distribution data system are directed to energy management based on energy demand and supply forecasting.

Other variations to the disclosed embodiments can be understood and effected by those skilled in the art in practicing the claimed invention, from a study of the drawings, the dis-closure, and the appended claims.

In the claims, the words "comprise" and "include" do not exclude other elements or steps, and the indefinite article "a" or "an" does not exclude a plurality.

A single unit of the resource distribution data system may perform several steps of the method recited in the claims. The mere fact that certain measures are recited in mutually different dependent claims does not indicate that a combination of these measures cannot be used to advantage.

Method steps like receiving values for attributes associated to respective identifiers from a plurality of different data sources, blending the received values for the attributes into a dataset, such that the dataset includes a plurality of identifiers and one or more values for one or more attributes are assigned to each of the identifiers, assigning data lineages to the values for the attributes based on the data source from which a respective value for a respective attribute was received, receiving a query for providing a data subset of the dataset based on one or more of the attributes, providing the data subset based on the query, determining a knowledge contribution of each of the data sources to the data subset based on the data lineages of the values for the attributes included in the dataset relevant for the query, determining shares of resources to be distributed to the different data sources based on the knowledge contribution of each of the data sources to the data subset, et cetera performed by one or several units can be performed by any other number of units. These method steps and/or the method can be implemented as program code means of a computer program product and/or as dedicated hardware.

The data storage may be any suitable medium, such as an optical storage medium, or a solid-state medium, supplied together with or as part of other hardware. The computer program product may also be distributed in other forms, such as via the Internet, Ethernet, or other wired or wireless telecommunication systems.

The present invention relates to distributing resources to different data sources based on their knowledge contribution. Values for attributes associated to respective identifiers can be received from a plurality of different data sources. The received values for the attributes can be blended into a dataset, such that the dataset includes a plurality of identifiers and one or more values for one or more attributes are assigned to each of the identifiers. Data lineages can be assigned to the values for the attributes based on the data source from which a respective value for a respective attribute was received. A query for providing a data subset of the dataset based on one or more of the attributes can be received. The data subset can be provided based on the query. A knowledge contribution of each of the data sources to the data subset can be determined based on the data lineages of the values for the attributes included in the dataset relevant for the query. Shares of resources to be distributed to the different data sources can be determined based on the knowledge contribution of each of the data sources to the data subset.

It is expected that during the life of a patent maturing from this application many relevant resource distribution data systems and methods for distributing resources will be developed and the scope of the terms resource distribution, data systems as well as processors and computers are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A method for distributing resources, comprising the steps:
   receiving, by one or more processors, values for attributes associated to respective identifiers from a plurality of different data sources,
   blending, by the one or more processors, the received values for the attributes into a dataset, such that the dataset includes a plurality of identifiers and one or more values for one or more attributes are assigned to each of the identifiers,
   assigning, by the one or more processors, data lineages to the values for the attributes based on the data source from which a respective value for a respective attribute was received,
   receiving, by the one or more processors, a query for providing a data subset of the dataset based on one or more of the attributes,
   providing, by the one or more processors, the data subset based on the query,
   determining, by the one or more processors, a knowledge contribution of each of the data sources to the data subset based on the data lineages of the values for the attributes included in the dataset relevant for the query, and
   instructing, by the one or more processors, a distribution of shares of resources to the different data sources based on the knowledge contribution of each of the data sources to the data subset.

2. The method according to claim 1 for distributing resources based on data usage, wherein the method comprises the steps:
   providing, by the one or more processors, attribute weights to the attributes based on a type of a respective attribute, and
   determining, by the one or more processors, a data usage of each of the data sources for the data subset based on the knowledge contribution of each of the data sources to the data subset and the attribute weights, and
wherein the shares of the resources to be distributed to the different data sources are determined based on the data usage of each of the data sources for the data subset.

3. The method according to claim 2, wherein the method comprises the step:
   providing, by the one or more processors, a respective attribute weight to each of the attributes based on heuristic rules or a machine learning model which optimizes the attribute weights based on one or more attribute parameters.

4. The method according to claim 2, wherein the method comprises the step:
   determining, by the one or more processors, the data usage of each of the data sources for the data subset based on the formula:

$$U(k, q) = \frac{\sum_{j=0}^{n} N(k, j) \cdot W(j)}{\sum_{k=0}^{m} \sum_{j=0}^{n} N(k, j) \cdot W(j)}$$

with U(k,q) a data usage of the data source k for query q, N(k,j) a knowledge contribution of data source k to an attribute j, and W(j) an attribute weight of the attribute j, n a number of attributes, and m a number of data sources.

5. The method according to claim 1, wherein the method comprises the step:
   assigning, by the one or more processors, the received values for the attributes to cells of the dataset, such that each value for an attribute is a value for an atomic attribute included in one cell of the dataset and such that the values for the atomic attributes have identical data lineages as assigned to the values for the attributes.

6. The method according to claim 1, wherein determining, by the one or more processors, the knowledge contribution of each of the data sources to the data subset is performed by counting a number of cells in the dataset that include a value for an atomic attribute with data lineage of a respective data source and which is relevant for the query for each of the data sources.

7. The method according to claim 1, wherein the method comprises the step:
providing, by the one or more processors, a priority score to each data source for each attribute based on one or more priority parameters, and
wherein assigning the data lineages to the values for the attributes is performed additionally based on the priority scores.

8. The method according to claim 7, wherein providing, by the one or more processors, the priority score to each data source for each attribute is performed based on heuristic rules or a machine learning model which optimizes the priority score based on the one or more priority parameters.

9. The method according to claim 7, wherein providing, by the one or more processors, the priority score to each data source for each attribute is performed additionally based on an event trigger or a time trigger.

10. The method according to claim 7, wherein the method comprises the step:
assigning, by the one or more processors, a respective value for a respective attribute received from a respective data source to a respective identifier based on the priority score of the respective data source for the respective attribute.

11. The method according to claim 1, wherein the method comprises the steps:
providing, by the one or more processors, the data subset to a data target and
receiving resources from the data target.

12. The method according to claim 11, wherein the method comprises the step:
distributing the shares of the resources to the different data sources.

13. A computer program product for distributing resources, wherein the computer program product comprises program code means for causing a resource distribution data system to carry out the method as defined in claim 1, when the computer program product is run on the resource distribution data system.

14. A resource distribution data system for distributing resources,
wherein the resource distribution data system comprises:
one or more memory components having computer readable code stored thereon; and
one or more processors operatively coupled to the one or more memory components and configured to execute the computer readable code for:
receiving values for attributes associated to respective identifiers from a plurality of different data sources,
blending the received values for the attributes into a dataset, such that the dataset includes a plurality of identifiers and one or more values for one or more attributes are assigned to each of the identifiers,
assigning data lineages to the values for the attributes based on the data source from which a respective value for a respective attribute was received,
receiving a query for providing a data subset of the dataset based on one or more of the attributes,
providing the data subset based on the query,
determining a knowledge contribution of each of the data sources to the data subset based on the data lineages of the values for the attributes included in the dataset relevant for the query, and
sending control signals to a network, said control signals instructing a distribution of shares of resources to the different data sources based on the knowledge contribution of each of the data sources to the data subset.

15. A computer program product for distributing resources, wherein the computer program product comprises program code means for causing the resource distribution data system according to claim 14 when the computer program product is run on the resource distribution data system.

16. A computer readable medium having stored the computer program product of claim 14.

* * * * *